July 9, 1946.   J. E. SHAFER   2,403,687
SEAL FOR BEARINGS
Filed Feb. 5, 1940
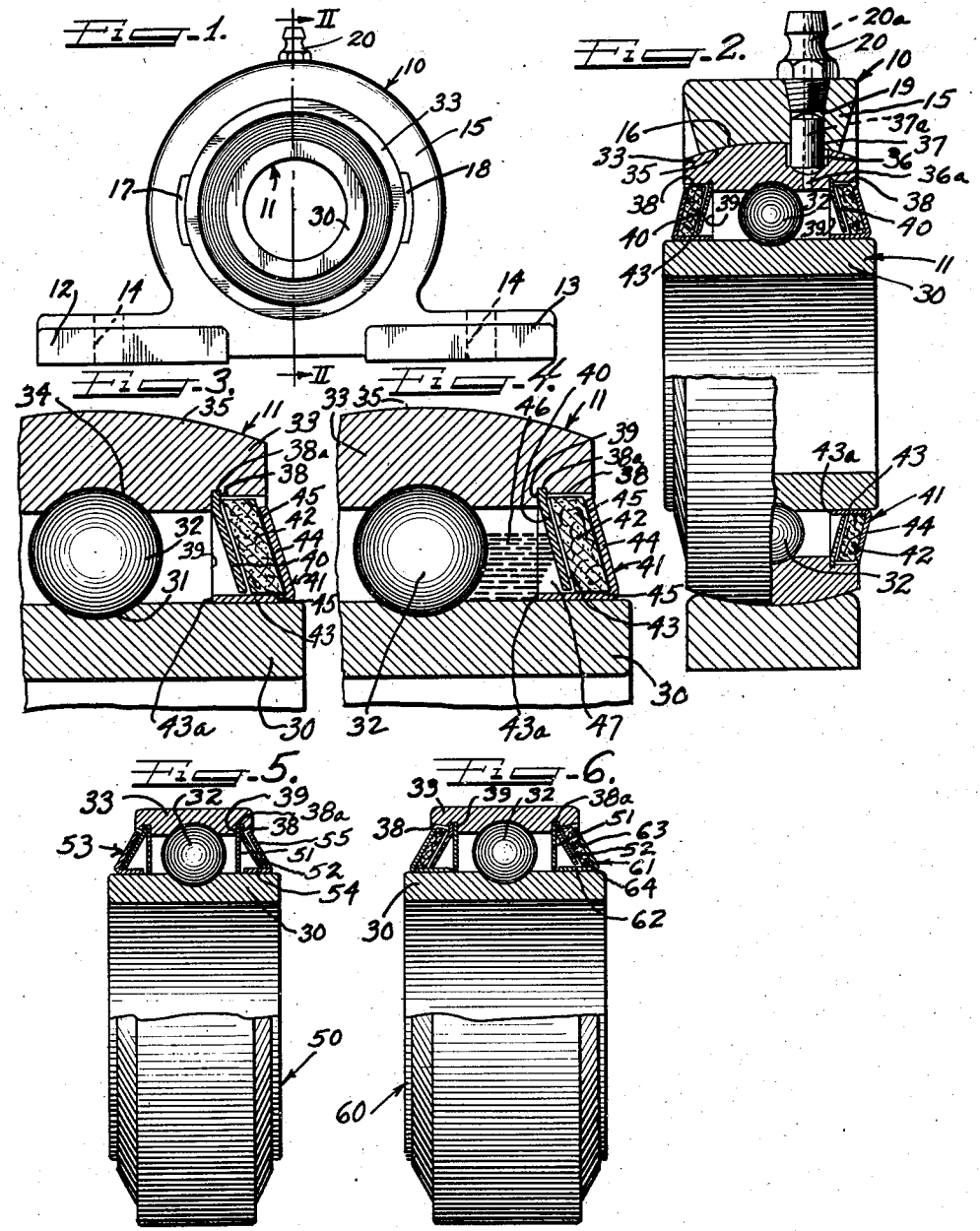
Inventor
JULIUS E. SHAFER.

Patented July 9, 1946

2,403,687

UNITED STATES PATENT OFFICE 2,403,687

SEAL FOR BEARINGS

Julius E. Shafer, Chicago, Ill.

Application February 5, 1940, Serial No. 317,278

9 Claims. (Cl. 286—5)

This invention relates to sealed bearings and more specifically relates to a seal for anti-friction bearings including retainer and flinger assemblies for mounting on the race rings of a bearing and having operating clearance therebetween to eliminate friction while at the same time preventing egress of lubricant from the bearing and ingress of dirt to the bearing.

This application is a continuation-in-part of my copending application entitled "Bearings," Serial No. 158,449, filed August 11, 1937, now Patent No. 2,189,838.

In my above referred to copending application there are disclosed and claimed bearing seals including retainers carried by the outer race ring of a bearing and projecting inwardly into spaced relation from the inner race ring of the bearing, flingers having base portions pressed onto the inner race ring and flange portions extending toward the outer race ring, and felt washers or sealing rings disposed between the retainers and flingers.

I have now found that the felt washer or flexible sealing ring operates more efficiently if the same is affixed to the base and flange of the flinger and has an operating clearance with the stationary portion of the bearing including the outer race ring carried retainer and outer race ring structure itself. According to the present invention, the felt washer or flexible sealing ring is attached on or cemented to the flinger both along its outer face and inner circumference. The ring is sized so as to only extend into spaced relation from the retainer and outer race ring of the bearing.

In a modified embodiment of the invention the flexible sealing ring is replaced with a metal ring carried by the outer race ring of the bearing and projecting into the space btween the retainer and flinger so as to extend along the flinger flange to provide a running fit therewith. The metal ring and flinger thus have an operating clearance therebetween of the same order as the operating clearance between the flinger carried flexible ring and the retainer.

In still another modification of the invention the intermediate ring is dispensed with and the flinger and retainer are closely spaced together with an operating clearance therebetween. The flinger and retainer have sloping side walls designed to retard ingress of dirt and eliminate egress of lubricant.

A feature of the invention includes the positioning of flinger assemblies and retainers in closely spaced relation along surfaces which are inclined relative to the race rings of a bearing. The spaced surfaces preferably have an acute angular relationship with the inner circumference of the bearing outer race ring as well as with the outer circumference of the bearing inner race ring.

While the invention will be hereinafter specifically described in connection with pillow block bearing units, it should be understood that the bearing seals of this invention are adapted for use on any type of bearing including spaced race rings.

It is, then, an object of the invention to provide seals for anti-friction bearing assemblies including retainer and flinger assemblies carried by the bearing race rings and held in closely spaced relation to provide an operating clearance therebetween.

A specific object of the invention is to provide a bearing seal including an inner retainer, an outer flinger and a sealing ring disposed between the retainer and flinger to have a close running fit along an extended surface with an adjacent relatively movable member.

Another specific object of the invention is to provide a seal for anti-friction bearings including a flinger having a base portion and an outturned flange together with a flexible sealing ring affixed to the base portion and flange as an immovable part thereof.

Another object of the invention is to provide a bearing seal having relatively movable members carried by the respective race rings of a bearing and disposed in closely spaced relation to each other along a surface having an acute angular relationship with the bearing race rings.

A further specific object of the invention is to provide bearing seals having extended sloping surfaces with a running clearance therebetween of from .0005 to .0010 inch.

Other and further objects of the invention will be apparent to those skilled in the art from the following detailed description of the annexed sheet of drawings, which discloses preferred embodiments of the invention.

On the drawing:

Figure 1 is a side-elevational view of a sealed bearing unit according to this invention mounted in a one-piece pillow block.

Figure 2 is an enlarged vertical cross-sectional view, with parts in elevation, taken substantially along the line II—II of Figure 1.

Figure 3 is a further enlarged fragmentary cross-sectional view similar to Figure 2 but illustrating the bearing seal in greater detail.

Figure 4 is a vertical cross-sectional view similar to Figure 3 illustrating the grease-retention effected by the bearing seal.

Figure 5 is an end elevational view of a modified sealed bearing, with a portion broken away and shown in vertical cross section.

Figure 6 is another end elevational view of a bearing equipped with a further modified seal according to this invention and partially broken away to illustrate the seal in vertical cross section.

As shown on the drawing:

In Figures 1 and 2 the reference numeral 10 designates generally a one-piece pillow block having a sealed bearing unit 11 mounted therein. The pillow block 10 is provided with feet 12 and 13 having holes or slots 14 formed therethrough for receiving bolts to rigidly attach the pillow block to a supporting structure (not shown). An annular strap portion 15 is formed intermediate the feet 12 and 13 and is provided with a concave or depressed inner face 16 forming a bearing surface for the outer race ring of the sealed bearing unit 11.

Slots or grooves 17 and 18 are formed in the strap portion 15 on the inner wall thereof to permit insertion of the bearing unit 11 horizontally into the pillow block. The bearing, when thus inserted in the slots 17 and 18, can then be rotated to a vertical position to be seated on the bearing wall 16 of the strap 15.

The top of the strap 15 has a radial bore 19 therethrough receiving a lubricant fitting 20 in threaded relation therein. The lubricant fitting projects from the top of the pillow block and has a passageway 20a therethrough for supplying lubricant to the interior of the bore 19 for a purpose to be hereinafter more fully described.

The bearing unit 11 as shown in Figures 1 to 4 comprises an inner race ring 30 adapted to be disposed around a shaft or other rotating member (not shown). The race ring 30 has a circumferential groove 31 forming a raceway for a row of ball bearings such as 32. An outer race ring 33 is disposed in spaced concentric relation around the race ring 30 and has a groove 34 around the inner circumference thereof for receiving the row of ball bearings such as 32. The ball bearings thus hold the race rings 30 and 33 in spaced concentric relation.

The periphery of the outer race ring 33 has a convex surface 35 for fitting in the concave surface 16 of the strap 15 as shown in Figure 2. A well or closed perimeter dimple 36 is formed in the outer race ring 33 for receiving a retainer pin 37 projecting freely from the bore 19 in the strap 15. The retainer pin 37 fits loosely in the dimple 36 and has an axial aperture 37a therethrough for transmitting lubricant from the fitting 20a to the dimple 36. The bottom of the dimple has a passageway 36a extending therefrom into the space between the race rings 30 and 33. In this manner, lubricant is supplied to the anti-friction elements between the race rings and the outer race ring is held in the pillow block. However, the bearing unit 11 can have limited universal movement relative to the pillow block since the retaining pin 37 fits loosely in the dimple 36.

The ends of the outer race ring 33 are countersunk around the inner circumference of the ring for a distance projecting into the ring as at 38. This provides radial shoulders 39 around the inside of the outer race ring in spaced relation from the ends of the ring. The countersunk portions 38 are locally recessed adjacent the shoulder 39 as at 38a.

A retainer ring 40 is pressed into each recessed groove 38a of the outer race ring against the shoulder 39. The retainer rings 40 diverge outwardly from the shoulder 39 and project inwardly into spaced relation from the inner race ring 30. The retainers thus have a flat portion seated in the recesses 38a and against the shoulders 39 and an outwardly sloping main wall portion bridging the space between the race rings. The main wall portion is disposed at an acute angle relative to the race rings and is preferably tilted about 15° from the vertical.

A flinger assembly including a metal flinger ring 41 and a felt washer 42 cooperates with each retainer 40 to provide a seal for the space between the race rings. The metal flinger ring 41 has a flat base portion 43 pressed onto the inner race ring 30 and projecting beyond the inner edge of the retainer 40. The inner terminal end of the base 43 may be aligned with the shoulder 39 of the outer race ring as shown but, in any event, should project beyond the inner edge of the retainer. The top wall of the base 43 is thus disposed outwardly from the outer surface of the race ring 30 so as to define a shoulder 43a around the inner race ring on each side of the anti-friction elements. As shown in Figures 2, 3 and 4 of the drawing, the inner end of the retainer 40 is in closely spaced relation from the base 43, to provide an operating clearance therebetween.

The retainer ring 41 has an outturned flange 44 extending from the outer edge of the base 43 and projecting outwardly and inwardly toward the outer race ring 33 into spaced relation from the countersunk portion 38 thereof. The flange 44 is in spaced parallel relation to the main sloping portion of the retainer 40.

The felt sealing ring 42 is affixed to both the base 43 and the flange 44 of the flinger by means of a cement or a friction bond 45 coextensive with the inner circumference and the outer face of the sealing ring. The ring 42 thus travels with the flinger 41. A cellulose or lacquer-type cement can be used to affix the felt to the flinger or the felt can be frictionally held on the flinger so as to be a fixed portion thereof. In some instances it may be sufficient to provide the flinger with roughened surfaces for retaining the felt ring thereagainst. Said roughened surfaces can, if desired, be produced by a rust-proof coating on the flinger.

The flinger holds the felt sealing ring in closely spaced relation to the retainer and the countersunk portion 38 of the outer race ring. A close-running fit between the felt and the outer race ring carried structures is desirable and clearances of the order of .0005 to .0010 inch have been found to be efficient.

As shown in Figure 4, grease 46 is packed between the race rings around the anti-friction elements 32 and when the inner race ring 30 is rotated, the grease will be flung tangentially or radially off of the outer surface of the inner race ring toward the inner surface of the outer race ring. However, since the base 43 of the flinger provides a side wall with its inner terminal edge 43a, this edge defines a grease groove and directs the grease against the sloping surface of the retainer 42 above the inner end of the retainer. Thus, it will be found, after operating the bearings, that the grease 46 assumes the pattern shown in Figure 4 and a hollow void 47 is actually provided adjacent the inner edge of the retainer. As a result, grease does not enter the chamber containing the felt sealing ring. However, if any grease is flushed into this chamber the sloping position of the sealing ring 42 will prevent radial discharge of the grease. In other words the grease cannot be discharged by centrifugal force along the space between the felt and the retainer without striking against the side wall of the felt.

Likewise, as best shown in Figures 3 and 4, the felt is exposed to the atmosphere above the flange 44 of the retainer and has a close running fit with the countersunk portion 38 of the outer race ring. This prevents ingress of dirt into the bearing unit since the dirt must pass through the small space provided by the operating clearance and then must travel inwardly against the action of centrifugal force. This, of course, is impossible since the rotating felt and flinger will serve to throw the dirt outward.

In Figures 5 and 6 the reference numerals 50 and 60 respectively designate modified sealed bearing units according to this invention. In each of these figures parts substantially identical with parts described in connection with Figures 1 to 4 have been marked with the same reference numerals. It should be noted that the outer race ring 33 of each bearing unit shown in these figures have flat outer surfaces instead of convex surfaces as described in Figures 1 to 4. These sealed bearing units are adapted for use in housings having flat inner walls such as flange units, hangers and the like.

In Figure 5, substantially flat retainer rings 51 are pressed into the grooves 38a in the outer race ring 33 on each side of the anti-friction elements 32. Each retainer 51 is bottomed against the shoulder 39 provided by the countersunk portion 38.

The retainers 51 project radially inward from the race ring 33 into closely spaced relation from the outer surface of the inner race ring 30.

The grooves 38a in the outer race ring also have metal sealing rings 52 pressed therein and projecting inwardly from the race ring along a non-radial path preferably about 30° from the vertical. These metal sealing rings 52 thus abut the retainers 51 at their outer peripheries but diverge from the retainers as they approach the inner race ring. The metal sealing rings define triangular chambers with the retainers 51.

A flinger 53 has a base portion 54 pressed on the inner race ring 30 under each sealing ring 52. Each flinger 53 has an outturned flange 55 sloping inwardly toward the countersunk portions 38 of the outer race ring. The flange 55 is parallel with and in closely spaced relation to the sloping portion of the sealing ring 52 so that these members have a running clearance therebetween. Likewise, the inner edge of each sealing ring 51 is closely spaced from the base 54 of the flinger. The bases 54 of the flingers project beyond the inner edges of the sealing rings and terminate just short of the inner edges of the retainer rings 51.

In the seal shown in Figure 5, therefore, the felt sealing ring is replaced with a metal sealing ring depending from the outer race ring of the bearing. The flinger underlaps this metal ring in the same manner as the flinger underlaps the retaining ring shown in Figures 2 to 4.

The anti-friction elements 32 are thus sealed in a chamber bounded at the sides by the retainers 51 and grease cannot emerge from this chamber since it will be trapped in the trangular shaped chamber formed by the sealing ring and the retainer ring.

The flinger flange and the metal sealing ring are inclined more than the flinger flange and the felt shown in Figures 2 to 4, but in each instance, the elements have an acute angular relationship with the race rings.

In Figure 6 the retainers 51 and metal sealing rings 52 are disposed in the same relation as shown in Figure 5. However, the flingers 61 have bases 62 of increased width so that the sloping outer flanges 63 thereof are spaced outwardly from the sealing rings. The space is sufficient to house a felt sealing ring 64 which is secured to the flinger flange and base as described in connection with Figures 2 to 4. In this embodiment of the invention relatively movable closely spaced metal-to-metal parts are eliminated and the felt rings 64 are interposed between the stationary metal sealing rings 52 and the revolving flinger flanges 63.

From the above descriptions it should be understood that this invention provides sealed bearing units and seals for bearings which efficiently hold lubricant in the anti-friction element chamber of a bearing. The seals shown in Figures 1 to 4 and 6 efficiently prevent ingress of dirt to this anti-friction element chamber. The seals shown in Figure 5 are best suited for operation under relatively clean surrounding conditions but have a definite retarding effect upon ingress of dirt to the anti-friction element chamber.

The seals of the invention include stationary and movable parts held in closely spaced relation with a running clearance therebetween and have an angular relationship to break up centrifugal forces tending to discharge grease from the bearing. The seals are readily applied to bearing units by simple pressure operations. In some modifications of the invention, flexible sealing rings such as felt, leather or steel wool members are affixed to rotatable flingers and held by the flingers in spaced relation from adjacent stationary or relatively moving parts. In other modifications of the invention, solid metal sealing rings are used.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The combination with a pair of rings disposed one within the other, of a retainer carried by one of the rings and projecting toward the other ring into spaced relation from said other ring, a flinger having a base secured onto said other ring extending into spaced relation from the end of the retainer, said flinger having a flange extending from said base thereof into spaced relation from the ring carrying said retainer, and a yieldable sealing ring affixed to the base and flange of the flinger in the space between the flinger and retainer, said yieldable sealing ring being held by said flinger in closely spaced relation from the retainer and the ring carrying said retainer and being exposed at the outer peripheral edge of the flinger flange.

2. A bearing seal comprising a retainer ring having a sloping side wall, a flinger having a base projecting through said retainer and a sloping side wall spaced from the sloping side wall of the retainer, and a flexible sealing ring affixed to said flinger and held thereby in closely spaced relation from said retainer.

3. The combination with a pair of rings disposed one within the other, of a flinger secured on the inner ring and having an outturned flange sloping at an acute angle relative to said inner ring, a flexible sealing ring bonded to said flinger, and a retainer ring projecting inwardly from the outer ring in spaced parallel relation from the flinger flange, said flinger holding said flexible ring from said retainer to provide a running clearance therebetween.

4. The combination with a pair of rings disposed one within the other, of a third ring secured in the outer ring and projecting into spaced relation from the inner ring, said third ring having a sloping wall portion disposed at an acute angle relative to the outer ring, a flinger having a flange axially outward of and parallel with said wall portion and a base pressed onto the inner ring projecting beyond the inner edge of the third ring, and the terminal end of said base defining a shoulder axially inward of the inner end of said third ring.

5. In a bearing seal including a retainer ring and a flinger, the improvement which comprises a flexible sealing ring bonded to the flinger and held thereby in spaced relation from the retainer along an inclined path.

6. In a bearing seal including a retainer ring and a flinger, the improvement which comprises a sealing ring operatively secured to the flinger and having an extensive surface thereof held by the flinger in closely spaced relation to the retainer.

7. The combination with a pair of rings disposed one within the other, of a retainer projecting radially inward from the outer ring into spaced relation from the inner ring, a second ring secured in the outer ring adjacent the retainer and projecting toward the inner ring along a sloping path diverging outwardly from the retainer, a flinger having a base portion pressed onto the inner ring and projecting under the second ring together with a flange portion extending outwardly along a sloping path parallel to the second ring, and a flexible ring bonded to the flinger and held thereby in closely spaced relation from said second ring.

8. The combination with a pair of rings disposed one within the other, of a third ring carried by the outer ring and projecting into spaced relation from the inner ring, said third ring having a sloping wall portion disposed at an acute angle relative to the outer ring, a flinger having a flange spaced axially outward from said wall portion and a base on the inner ring extending from said flange under the inner edge of the third ring to a point spaced axially inward from the third ring, and said base of the flinger having a terminal end defining a shoulder.

9. The combination with a pair of rings disposed one within the other and held in radially spaced apart relationship and against substantial relative movement in an axial direction, of a third ring secured in the outer ring and flaring axially outwardly and radially inwardly toward the inner ring and with its free edge terminating in spaced relation from said inner ring, a flinger having a flange spaced axially outward from said third ring and flaring radially outwardly and axially inwardly toward the outer ring and with its free edge terminating in spaced relation to said outer ring, said flinger carrying a sealing face in closely spaced sealing relation along the third ring, a base on said flinger carried on the inner ring extending from said flange under and beyond said free edge of the third ring, and the terminal end of said base defining a shoulder.

JULIUS E. SHAFER.